United States Patent
Nichols et al.

(10) Patent No.: US 8,160,755 B2
(45) Date of Patent: Apr. 17, 2012

(54) DISPLAYING AIR TRAFFIC SYMBOLOGY BASED ON RELATIVE IMPORTANCE

(75) Inventors: Troy Nichols, Peoria, AZ (US); John G. Suddreth, Cave Creek, AZ (US)

(73) Assignee: Honeywell International Inc., Morristown, NJ (US)

(*) Notice: Subject to any disclaimer, the term of this patent is extended or adjusted under 35 U.S.C. 154(b) by 806 days.

(21) Appl. No.: 12/242,202

(22) Filed: Sep. 30, 2008

(65) Prior Publication Data
US 2010/0082184 A1    Apr. 1, 2010

(51) Int. Cl.
*G08G 1/16* (2006.01)

(52) U.S. Cl. ............ 701/3; 701/300; 701/301; 701/302; 701/400; 701/414; 701/439; 340/945; 340/961; 340/995.1; 340/435; 340/436; 342/29; 342/454; 342/455

(58) Field of Classification Search .................. None
See application file for complete search history.

(56) References Cited

U.S. PATENT DOCUMENTS

| | | | |
|---|---|---|---|
| 3,611,371 A | | 10/1971 | Morse |
| 5,179,377 A * | | 1/1993 | Hancock ..................... 340/961 |
| 5,227,786 A * | | 7/1993 | Hancock ..................... 340/961 |
| 6,054,937 A * | | 4/2000 | Von Viebahn et al. ........ 340/961 |
| 6,271,768 B1 * | | 8/2001 | Frazier et al. ................ 340/961 |
| 6,429,789 B1 | | 8/2002 | Kiridena et al. |
| 6,433,729 B1 * | | 8/2002 | Staggs ............................ 342/29 |
| 6,469,660 B1 * | | 10/2002 | Horvath et al. .............. 342/179 |
| 6,473,003 B2 * | | 10/2002 | Horvath et al. .............. 340/945 |
| 6,542,796 B1 | | 4/2003 | Gibbs et al. |
| 6,549,161 B1 * | 4/2003 | Woodell ..................... 342/26 R |
| 6,604,044 B1 * | 8/2003 | Kirk .............................. 701/120 |
| 6,826,458 B2 * | 11/2004 | Horvath et al. ................... 701/3 |
| 6,876,906 B1 | 4/2005 | Zellers et al. |
| 7,016,772 B2 * | 3/2006 | Yanagi ............................ 701/21 |
| 7,124,000 B2 * | 10/2006 | Horvath et al. ................... 701/3 |
| 7,161,500 B2 | 1/2007 | Alfredsson et al. |
| 7,205,907 B2 | 4/2007 | Naimer et al. |
| 7,280,896 B2 * | 10/2007 | Morizet et al. .................... 701/3 |
| 7,286,062 B2 * | 10/2007 | Feyereisen et al. ........... 340/961 |
| 7,307,578 B2 * | 12/2007 | Blaskovich et al. ........... 342/29 |
| 7,408,552 B2 * | 8/2008 | Kellman et al. ............... 345/440 |
| 7,412,308 B2 | 8/2008 | Naimer et al. |
| 7,724,178 B2 * | 5/2010 | Brandao et al. ................ 342/29 |
| 7,747,360 B2 * | 6/2010 | Canu-Chiesa et al. ........... 701/3 |
| 7,817,078 B2 * | 10/2010 | Bunch ......................... 342/26 B |
| 2002/0039070 A1 * | 4/2002 | Ververs et al. ................ 340/901 |
| 2002/0075171 A1 * | 6/2002 | Kuntman et al. ............. 340/961 |
| 2002/0089432 A1 * | 7/2002 | Staggs et al. ................. 340/945 |
| 2003/0137444 A1 * | 7/2003 | Stone et al. ..................... 342/30 |
| 2003/0151630 A1 * | 8/2003 | Kellman et al. ............... 345/838 |
| 2003/0193411 A1 * | 10/2003 | Price ............................. 340/973 |
| 2005/0010359 A1 * | 1/2005 | Qureshi ........................ 701/205 |
| 2005/0156777 A1 * | 7/2005 | King et al. ..................... 342/29 |
| 2005/0182528 A1 * | 8/2005 | Dwyer et al. ..................... 701/3 |

(Continued)

*Primary Examiner* — Jonathan M Dager
(74) *Attorney, Agent, or Firm* — Ingrassia Fisher & Lorenz, P.C.

(57) ABSTRACT

A method and system is provided for displaying aircraft symbology. The method includes displaying (302, 502, 702, 902, 1002) a symbol (202) for a first aircraft in a predetermined format, processing (304, 504, 704, 904, 1004) data related to flight conditions of the first aircraft and a second aircraft, determining (306, 506, 706, 906, 1006) a format for the display of the second aircraft based on the processed data, and displaying (308, 508, 708, 908, 1008) a symbol (212, 214, 216, 412, 416, 612, 614, 616, 812, 814, 816) for the second aircraft in accordance with the determined format.

7 Claims, 7 Drawing Sheets

U.S. PATENT DOCUMENTS

| | | | |
|---|---|---|---|
| 2005/0200501 A1* | 9/2005 | Smith | 340/963 |
| 2006/0004496 A1* | 1/2006 | Tucker et al. | 701/4 |
| 2006/0005147 A1* | 1/2006 | Hammack et al. | 715/805 |
| 2006/0020538 A1 | 1/2006 | Ram et al. | |
| 2006/0265109 A1* | 11/2006 | Canu-Chiesa et al. | 701/3 |
| 2007/0038339 A1* | 2/2007 | Shirley et al. | 701/14 |
| 2007/0078601 A1 | 4/2007 | Nakano et al. | |
| 2007/0168122 A1* | 7/2007 | Aspen | 701/211 |
| 2007/0179684 A1* | 8/2007 | He | 701/3 |
| 2010/0039310 A1* | 2/2010 | Smith et al. | 342/29 |

* cited by examiner

DISPLAYING AIR TRAFFIC SYMBOLOGY BASED ON RELATIVE IMPORTANCE

FIELD OF THE INVENTION

The present invention generally relates to display systems and more particularly to display systems having images displayed relative to importance to the viewer.

BACKGROUND OF THE INVENTION

It is important for pilots to know the position of other aircraft in their airspace that may present a hazard to safe flight. Typical two dimensional displays that illustrate other aircraft show text to provide important information such as altitude and speed. This text occupies much of the screen when there are several aircraft being displayed, thereby increasing the chance for confusion. Furthermore, the pilot must interpret the information provided in the text occupying her thought processes when she may have many other decisions to make.

One known system presents images of other aircraft in sizes depending on the altitude, for example, a small size when below a low altitude, a large size when above a high altitude, and a medium size when between the low and high altitudes. However, this system requires the pilot to consider his current altitude and remember which size image of the other aircraft represent the altitude range for his current altitude. The delineation may include more altitude levels, thereby making it even more difficult.

Accordingly, it is desirable to provide a method and system of displaying air traffic symbology that may be easily interpreted by the pilot. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

A method and system is provided for displaying aircraft symbology. The method includes displaying a symbol for a first aircraft in a predetermined format, processing data related to flight conditions of the first aircraft and a second aircraft, determining a format for the display of the second aircraft based on the processed data, and displaying a symbol for the second aircraft in accordance with the determined format. The system for displaying aircraft symbology for a first aircraft and a plurality of aircraft includes a processor for processing data related to flight conditions of the first aircraft and the plurality of aircraft and determining a format for the display of the second aircraft based on the processed data, and a display for displaying a symbol for the second aircraft in accordance with the determined format and a predetermined symbol for the first aircraft.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

A display system presents images of obstacle aircraft disposed from a base aircraft on a screen viewable by a pilot. The format of obstacle aircraft change in proportion to a predefined flight characteristic. The format may include, for example, different sizes or colors, and the predefined characteristics may include, for example, altitude, difference in altitude from the base aircraft, lateral distance from the base aircraft or its flight path, rate of closure with the base aircraft, and a combination of two or more of these flight characteristics.

While the exemplary embodiments described herein refer to displaying the information on airborne aircraft, the invention may also be applied to other exemplary embodiments such as displays in submarines and displays used by air traffic controllers.

Figure 1:
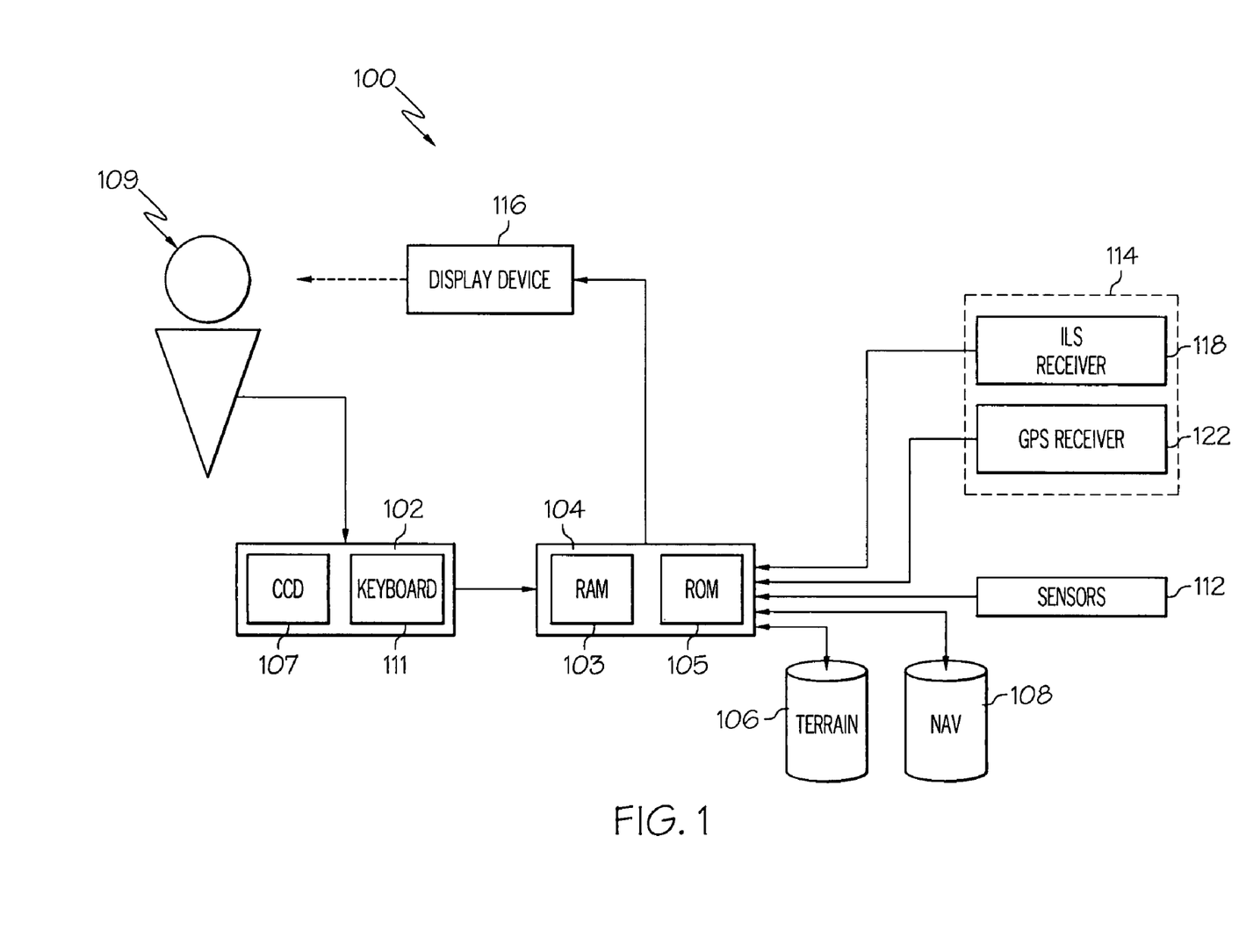
FIG. 1 is a block diagram of a system for conveying aircraft positioning in accordance with the exemplary embodiments herein.

Referring to FIG. 1, a known exemplary flight deck display system is depicted and will be described. The system 100 includes a user interface 102, a processor 104, one or more terrain databases 106, one or more navigation databases 108, various sensors 112, various external data sources 114, and a display device 116. The user interface 102 is in operable communication with the processor 104 and is configured to receive input from a user 109 (e.g., a pilot) and, in response to the user input, supply command signals to the processor 104. The user interface 102 may be any one, or combination, of various known user interface devices including, but not limited to, a cursor control device (CCD) 107, such as a mouse, a trackball, or joystick, and/or a keyboard, one or more buttons, switches, or knobs. In the depicted embodiment, the user interface 102 includes a CCD 107 and a keyboard 111. The user 109 uses the CCD 107 to, among other things, move a cursor symbol on the display screen (see FIG. 2), and may use the keyboard 111 to, among other things, input textual data.

The processor 104 may be any one of numerous known general-purpose microprocessors or an application specific processor that operates in response to program instructions. In the depicted embodiment, the processor 104 includes on-board RAM (random access memory) 103, and on-board ROM (read only memory) 105. The program instructions that control the processor 104 may be stored in either or both the RAM 103 and the ROM 105. For example, the operating system software may be stored in the ROM 105, whereas various operating mode software routines and various operational parameters may be stored in the RAM 103. It will be appreciated that this is merely exemplary of one scheme for storing operating system software and software routines, and that various other storage schemes may be implemented. It will also be appreciated that the processor 104 may be implemented using various other circuits, not just a programmable processor. For example, digital logic circuits and analog signal processing circuits could also be used.

No matter how the processor 104 is specifically implemented, it is in operable communication with the terrain databases 106, the navigation databases 108, and the display device 116, and is coupled to receive various types of inertial data from the various sensors 112, and various other avionics-related data from the external data sources 114. The processor 104 is configured, in response to the inertial data and the avionics-related data, to selectively retrieve terrain data from one or more of the terrain databases 106 and navigation data from one or more of the navigation databases 108 (including surface features such as roads), and to supply appropriate display commands to the display device 116. The display device 116, in response to the display commands, selectively renders various types of textual, graphic, and/or iconic information. The preferred manner in which the textual, graphic, and/or iconic information are rendered by the display device 116 will be described in more detail further below. Before doing so, however, a brief description of the databases 106, 108, the sensors 112, and the external data sources 114, at least in the depicted embodiment, will be provided.

The terrain databases 106 include various types of data representative of the terrain over which the aircraft is flying, and the navigation databases 108 include various types of navigation-related data. These navigation-related data include various flight plan related data such as, for example, waypoints, distances between waypoints, headings between waypoints, data related to different airports, navigational aids, obstructions, special use airspace, political boundaries, communication frequencies, and aircraft approach information. It will be appreciated that, although the terrain databases 106 and the navigation databases 108 are, for clarity and convenience, shown as being stored separate from the processor 104, all or portions of either or both of these databases 106, 108 could be loaded into the RAM 103, or integrally formed as part of the processor 104, and/or RAM 103, and/or ROM 105. The terrain databases 106 and navigation databases 108 could also be part of a device or system that is physically separate from the system 100.

The sensors 112 may be implemented using various types of inertial sensors, systems, and or subsystems, now known or developed in the future, for supplying various types of inertial data. The inertial data may also vary, but preferably include data representative of the state of the aircraft such as, for example, aircraft speed, heading, altitude, and attitude. The sensors 112, in one embodiment, include a radar system for gathering flight characteristics of other aircraft. In another embodiment, the sensors 112 include a receiver for receiving the information from another source, for example, from ground based radar, from a satellite, or from the obstacle aircraft themselves. The number and type of external data sources 114 may also vary. For example, the external systems (or subsystems) may include, for example, a terrain avoidance and warning system (TAWS), a traffic and collision avoidance system (TCAS), a runway awareness and advisory system (RAAS), a flight director, and a navigation computer, just to name a few. However, for ease of description and illustration, only an instrument landing system (ILS) receiver 118 and a global position system (GPS) receiver 122 are depicted in FIG. 1.

The display device 116, as noted above, in response to display commands supplied from the processor 104, selectively renders various textual, graphic, and/or iconic information, and thereby supply visual feedback to the user 109. It will be appreciated that the display device 116 may be implemented using any one of numerous known display devices suitable for rendering textual, graphic, and/or iconic information in a format viewable by the user 109. Non-limiting examples of such display devices include various cathode ray tube (CRT) displays, and various flat panel displays such as various types of LCD (liquid crystal display) and TFT (thin film transistor) displays. The display device 116 may additionally be implemented as a panel mounted display, a HUD (head-up display) projection, or any one of numerous known technologies. It is additionally noted that the display device 116 may be configured as any one of numerous types of aircraft flight deck displays. For example, it may be configured as a multi-function display, a horizontal situation indicator, or a vertical situation indicator, just to name a few. In the depicted embodiment, however, the display device 116 is configured as a navigation display.

The display device 116 is used to display various images and data, in both a graphical and a textual format, and to supply visual feedback to the user 109 in response to the user input commands supplied by the user 109 to the user interface 102. It will be appreciated that the display device 116 may be implemented using any one of numerous known display devices suitable for rendering image and/or text data in a format viewable by the user 109. Non-limiting examples of such display devices include various cathode ray tube (CRT) displays, and various flat panel displays such as, various types of LCD (liquid crystal display) and TFT (thin film transistor) displays. The display device 116 may additionally be implemented as a panel mounted display, a HUD (head-up display) projection, or any one of numerous known technologies.

Figure 2:
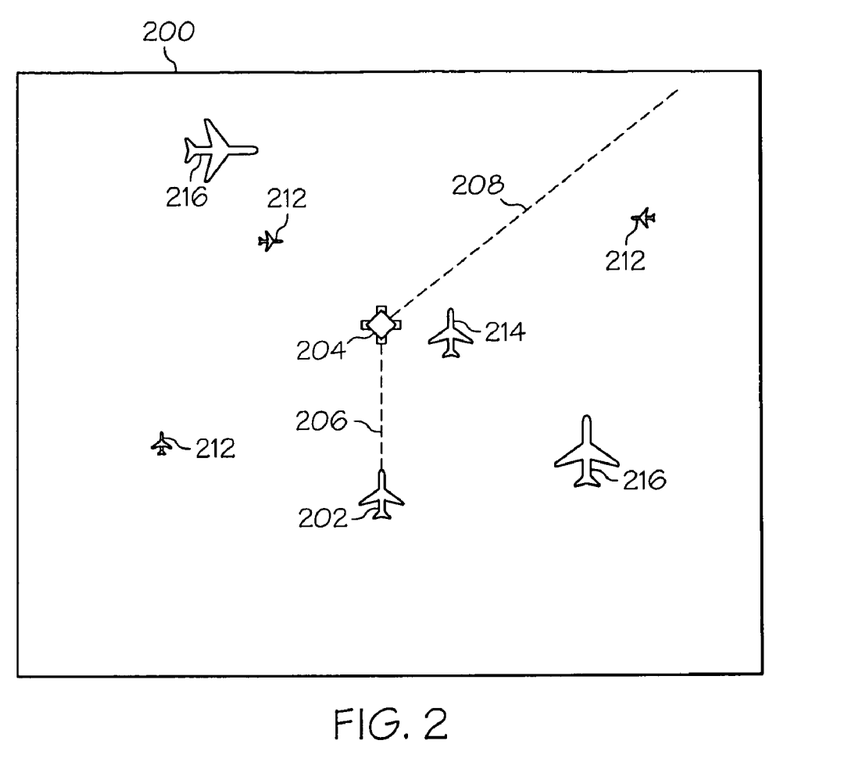
FIG. 2 is a simulated view on a display in accordance with a first exemplary embodiment.
Figure 3:
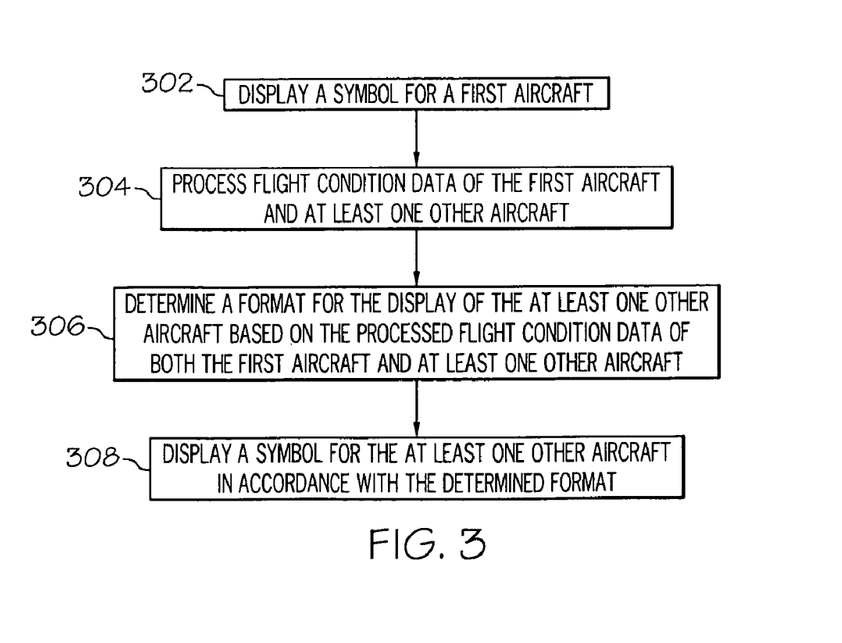
FIG. 3 is a flow chart in accordance with the first exemplary embodiment.

With reference to FIG. 2, the display 116 includes a display area 200 in which multiple graphical images may be simultaneously displayed. Although a top down view is depicted, it is understood that a vertical, or perspective, view could be depicted in accordance with the exemplary embodiments. The display area 200 includes a top-view aircraft symbol 202, and optionally one or more waypoint symbols 204 and line segments 206, 208 comprising a flight path. The display area 200 may also include various map features (not shown) including, but not limited to, terrain, political boundaries, and navigation aids, which, for clarity, are not shown in FIG. 2. A symbol 204 is displayed 302 (FIG. 3) for the base aircraft. Data is processed 304 for the base aircraft and, when received, for the relating to obstacle aircraft 212, 214, 216, from a distal source (not shown) such as ground stations or satellites or is generated from within the aircraft 202. For this first exemplary embodiment of FIG. 2, the data comprises positional data (longitude and latitude) and altitude. An image of each obstacle aircraft 212, 214, 216 is displayed 306 on the display area 200 in a location determined by the positional data. The format of each displayed aircraft 212, 214, 216 is determined 306 by the altitude (preferably in feet above sea level). The format may be defined by an image size proportional to the altitude—the higher the altitude, the larger the image. The image size may increase in increments. For example, aircraft below 10,000 feet will be displayed 308 with a small image 212, aircraft at 10,000 feet to 25,000 feet will be displayed with a medium image 214, and aircraft above 25,000 feet will be displayed with a big image 216. Alternatively, the aircraft image may increase linearly with an increase in altitude. The format may assume other distinctive features such as color. For example, a "hotter" red color may be displayed at low altitudes and a "cooler" blue color may be displayed at high altitudes.

Figure 4:
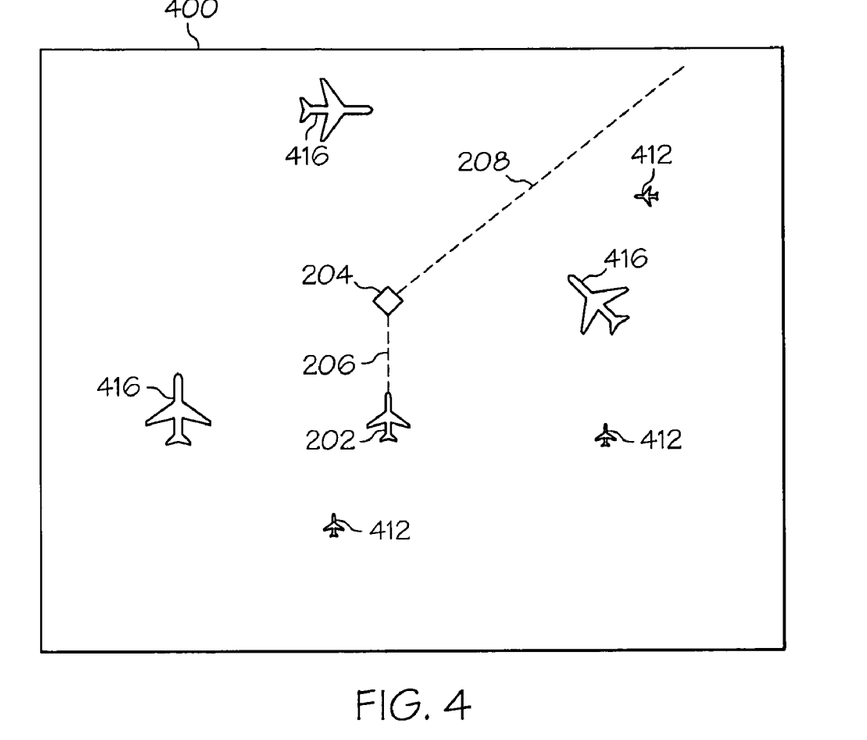
FIG. 4 is a simulated view on a display in accordance with a second exemplary embodiment.
Figure 5:
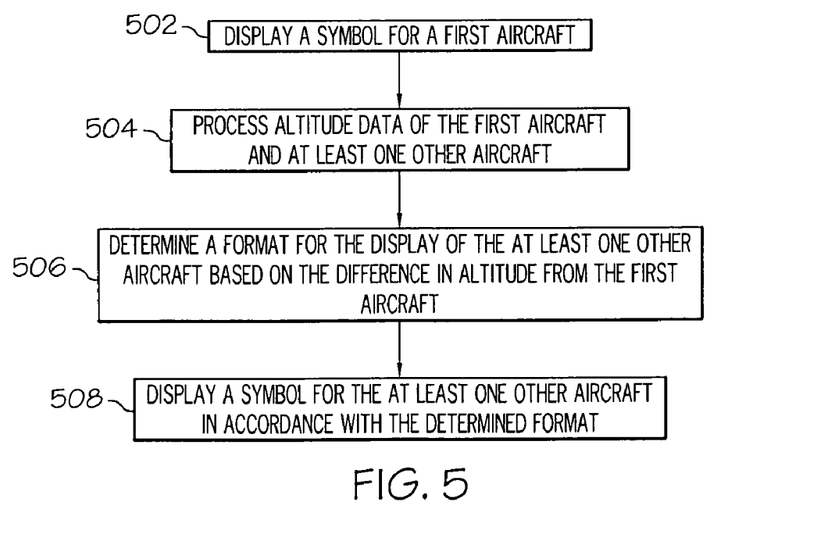
FIG. 5 is a flow chart in accordance with the second exemplary embodiment.

A second exemplary embodiment shown in FIGS. 4 and 5 includes a display area 400 having, as depicted in FIG. 4, a top-view aircraft symbol 202, and optionally one or more waypoint symbols 204 and line segments 206, 208 comprising a flight path. Although a top down view is depicted, it is understood that a vertical, or perspective, view could be depicted in accordance with the exemplary embodiments. The display area 400 may also include various map features including, but not limited to, terrain, political boundaries, and navigation aids, which, for clarity, are not shown in FIG. 4. A symbol 204 is displayed 502 for the base aircraft. Altitude data is processed 504 for the base aircraft and, when received, relating to the obstacle aircraft 412, 416, from a distal source (not shown) such as ground stations or satellites or is generated from within the aircraft 202. For this second exemplary embodiment of FIG. 4, the data comprises positional data (longitude and latitude) and altitude. An image of each obstacle aircraft 412, 416 is displayed 508 on the display area 400 in a location determined by the positional data. The format of each displayed aircraft 412, 416 is determined 504 by the difference in altitude from either the base aircraft altitude or the altitude of the line segments 206, 208. Note that the altitude of the line segments 206, 208 may vary over the duration of the flight path. The format may for example may be defined by an image size inversely proportional to the difference in altitude—the less the difference in altitude, the larger the image. The image size may increase in increments. For example, aircraft having an altitude difference greater than 3,000 feet will be displayed 508 with a small image 412, while aircraft having an altitude difference 3000 feet or less will be displayed 508 large image 416. Alternatively, the aircraft image may increase linearly with a decrease in altitude difference. The format may assume other distinctive features such as color. For example, a "hotter" red color may be displayed at low altitude differences and a "cooler" blue color may be displayed at larger altitude differences.

Figure 6:
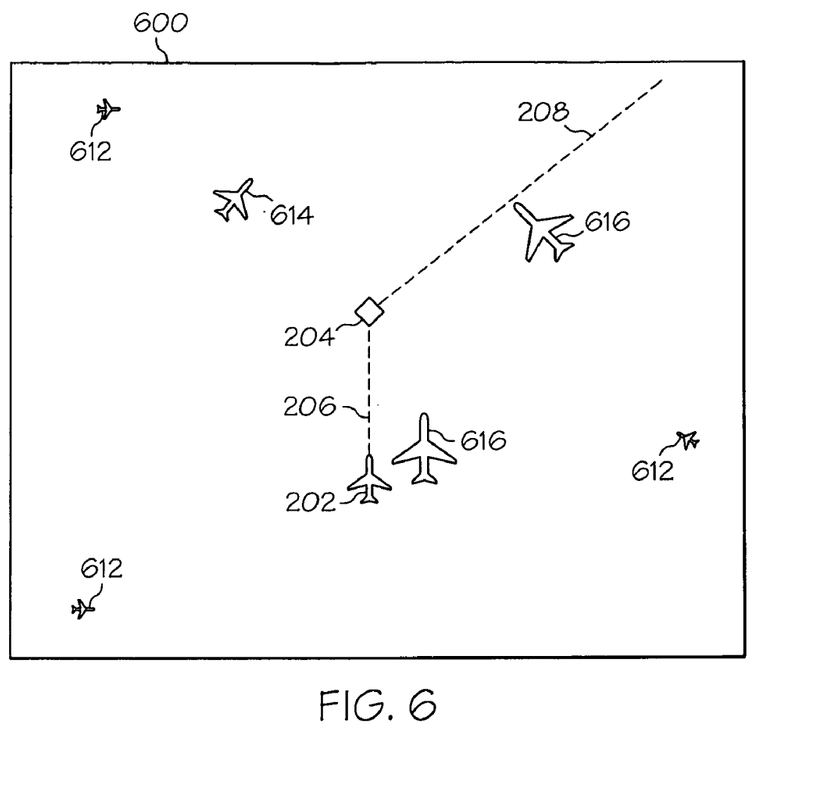
FIG. 6 is a simulated view on a display in accordance with a third exemplary embodiment.
Figure 7:
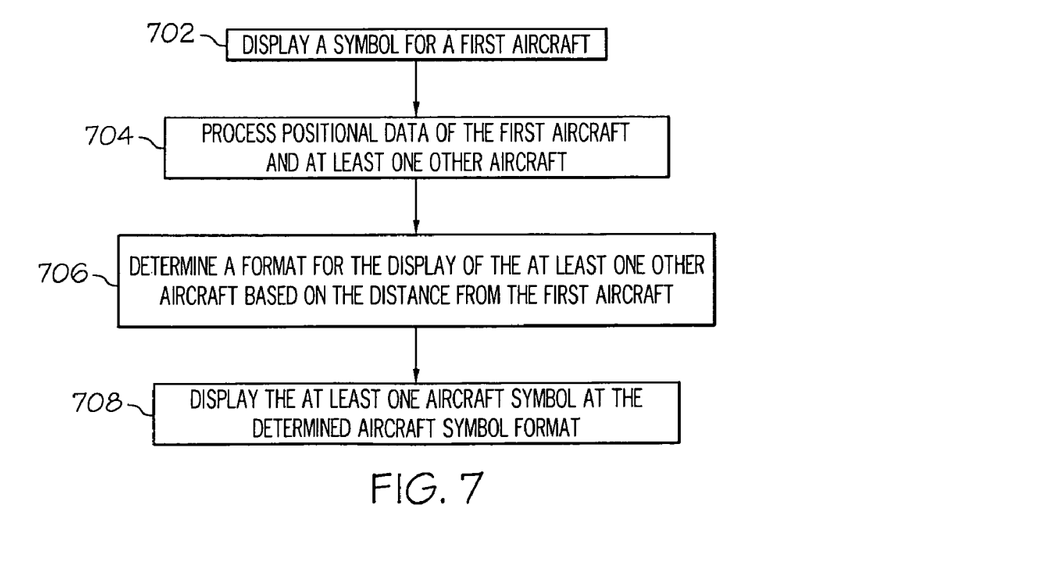
FIG. 7 is a flow chart in accordance with the third exemplary embodiment.

A third exemplary embodiment shown in FIGS. 6 and 7 includes a display area 600 having, as depicted in FIG. 6, a top-view aircraft symbol 202, and optionally one or more waypoint symbols 204 and line segments 206, 208 comprising a flight path. The display area 600 may also include various map features including, but not limited to, terrain, political boundaries, and navigation aids, which, for clarity, are not shown in FIG. 6. A symbol 204 is displayed 702 for the base aircraft. Positional data is processed 702 for the base aircraft and, when received, relation to the obstacle aircraft 612, 614, 616, from a distal source (not shown) such as a ground station or satellite or is generated from within the aircraft 202. For this third exemplary embodiment of FIG. 6, the data comprises positional data (longitude and latitude). An image of each obstacle aircraft 612, 614, 616 is displayed 708 on the display area 600 in a location determined by the positional data. The format of each displayed aircraft 612, 614, 616 is determined 706 by the difference in distance, which optionally may be lateral distance, from either the base aircraft position or the line segments 206, 208. Lateral distance is defined as between the base aircraft and an obstacle aircraft projected vertically at the same altitude. The format may for example may be defined by an image size inversely proportional to the distance—the less the distance, the larger the image. The image size may increase in increments. For example, aircraft within a mile will be displayed with a large image 616, while aircraft outside of a mile will be displayed with a small image 502. Alternatively, the aircraft image may increase linearly with an increase in distance. The format may assume other distinctive features such as color. For example, a "hotter" red color may be displayed close distances and a "cooler" blue color may be displayed at larger distances.

Figure 8:
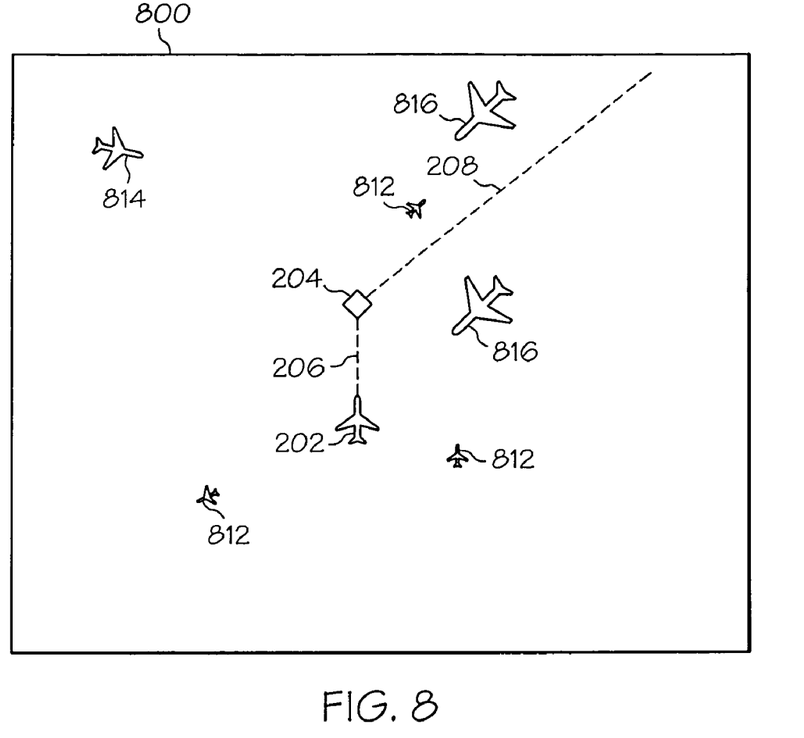
FIG. 8 is a simulated view on a display in accordance with a fourth exemplary embodiment.
Figure 9:
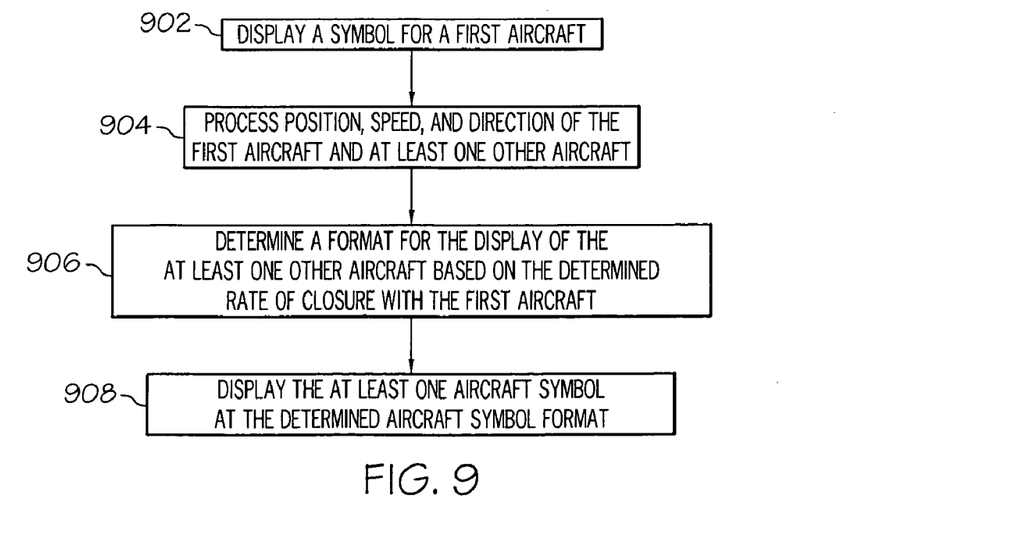
FIG. 9 is a flow chart in accordance with the fourth exemplary embodiment.

A fourth exemplary embodiment shown in FIGS. 8 and 9 includes a display area 800 having, as depicted in FIG. 8, a top-view aircraft symbol 202, and optionally one or more waypoint symbols 204 and line segments 206, 208 comprising a flight path. The display area 800 may also include various map features including, but not limited to, terrain, political boundaries, and navigation aids, which, for clarity, are not shown in FIG. 8. A symbol 204 is displayed 902 for the base aircraft. Data is processed 904 when received, for example, relating to obstacle aircraft 812, 814, 816, from a distal source (not shown) such as a ground station or satellite, or is generated from within the aircraft 202. For this fourth exemplary embodiment of FIG. 8, the data comprises positional data (longitude and latitude), direction, and speed. An image of each obstacle aircraft 812, 814, 816 is displayed 908 on the display area 800 in a location determined by the positional data. The format of each displayed aircraft 812, 814, 816 is determined 906 by the rate of closure between the base aircraft and the respective displayed aircraft 812, 814, 814. The format may for example may be defined by an image size proportional to the rate of closure—the greater the rate of closure, the larger the image. The image size may increase in increments. For example, aircraft closing at a rate greater than 50 mph will be displayed with a large image 816, while aircraft having a closure less than 50 mph will be displayed with a small image 802. Alternatively, the aircraft image may increase linearly with an increase in rate of closure. The format may assume other distinctive features such as color. For example, a "hotter" red color may be displayed higher rates of closure and a "cooler" blue color may be displayed for smaller rates of closure.

Figure 10:
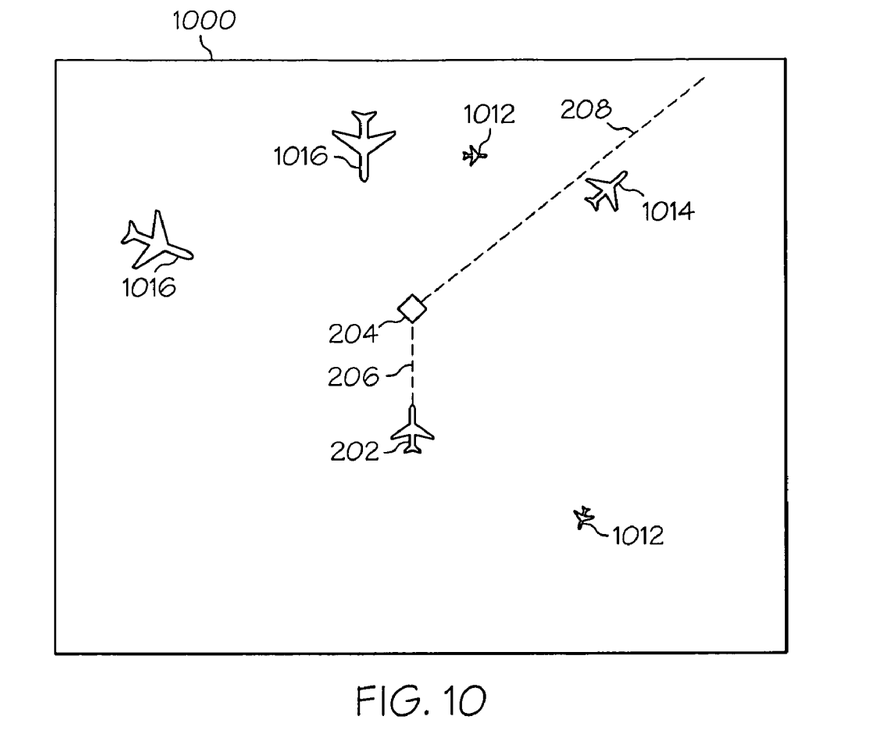
FIG. 10 is a simulated view on a display in accordance with a fifth exemplary embodiment.
Figure 11:
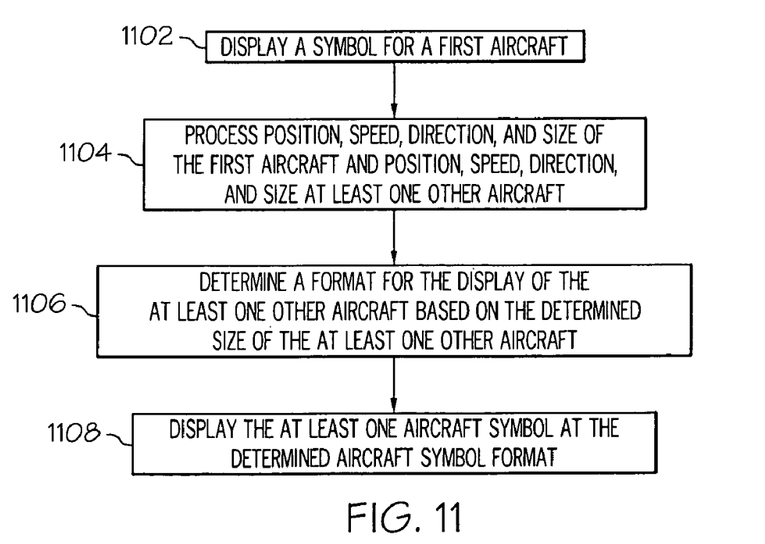
FIG. 11 is a flow chart in accordance with the fifth exemplary embodiment.
Figure 12:
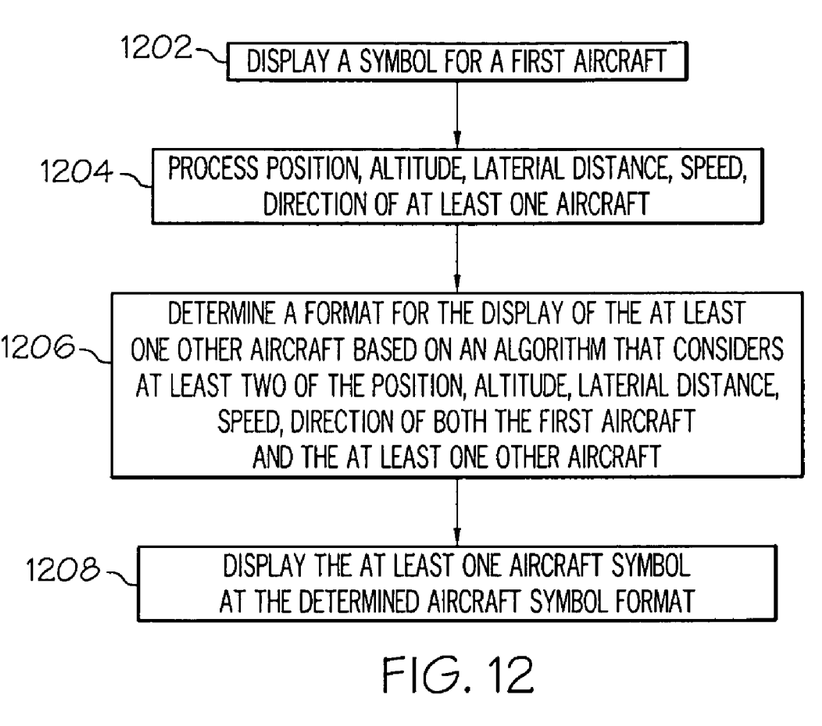
FIG. 12 is a flow chart in accordance with a fifth exemplary embodiment.

A fifth exemplary embodiment shown in FIGS. 10 and 11 includes a display area 1000 having, as depicted in FIG. 10, a top-view aircraft symbol 202, and optionally one or more waypoint symbols 204 and line segments 206, 208 comprising a flight path. The display area 1000 may also include various map features including, but not limited to, terrain, political boundaries, and navigation aids, which, for clarity, are not shown in FIG. 10. A symbol 204 is displayed 1102 for the base aircraft. Data is processed 1104 when received, for example, relating to obstacle aircraft 1012, 1014, 1016, from a distal source (not shown) such as a ground station or satellite, or is generated from the obstacle aircraft 1012, 1014, 1016. For this fifth exemplary embodiment of FIG. 10, the data comprises positional data (longitude and latitude), and obstacle aircraft size. Aircraft size may be defined as dimensions, weight, or type of the aircraft, e.g., a Boeing 777 is larger than a small business jet). An image of each obstacle aircraft 1012, 1014, 1016 is displayed 1108 on the display area 1000 in a location determined by the positional data. The format of each displayed aircraft 1012, 1014, 1016 is determined 1106 by the size of the obstacle aircraft 1012, 1014, 1014. The format may for example may be defined by an image size proportional to the aircraft size—the greater the size, the larger the image. The image size may increase in increments. For example, aircraft above a defined weight or dimensions will be displayed with a large image 1016, while aircraft having a weight or dimensions below another predefined value will be displayed with a small image 1012, while aircraft having a weight or dimensions inbetween will be displayed with a medium image 1014. Alternatively, the aircraft image may increase linearly with an increase in rate of closure. The format may assume other distinctive features such as color. For example, a "hotter" red color may be displayed higher rates of closure and a "cooler" blue color may be displayed for smaller rates of closure A sixth exemplary embodiment shown in FIG. 12 includes displaying 1202 a symbol for the base aircraft. Data is processed 1204 when received, for example, relating to obstacle aircraft, from a distal source (not shown) such as a ground station or satellite, or is generated from within a base aircraft. For this sixth exemplary embodiment of FIG. 12, the data comprises, for the base and obstacle aircraft, positional data (longitude and latitude), distance therebetween, direction, and speed. An image of each obstacle aircraft is displayed 1208 on the display area 1200 in a location determined by the positional data. The format of each displayed obstacle aircraft is determined 1206 by the altitude, difference in altitude, distance from the displayed base aircraft 202, and rate of closure between the base aircraft and the respective displayed obstacle aircraft. The image size may increase in increments. Alternatively, the aircraft image may increase linearly with an increase in rate of closure. The format may assume other distinctive features such as color. For example, a "hotter" red color may be displayed for obstacle aircraft considered more of a concern to flight safety and a "cooler" blue color may be displayed for obstacle aircraft of less concern.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

The invention claimed is:

1. A method for displaying aircraft symbology on a display, comprising:
   displaying, for a first aircraft, a flight path including a current line segment at a first altitude and a planned line segment at a second altitude;
   displaying a first symbol in a predetermined first size for the first aircraft flying at about the first altitude on the current line segment;
   processing a third altitude for a second aircraft within the current line segment;
   processing a fourth altitude for a third aircraft within the planned line segment;
   determining a second size based on the processed third altitude for the display of a second symbol for the second aircraft, wherein the second size is inversely proportional to the distance from the second aircraft to the first line segment;
   determining a third size based on the processed fourth altitude for the display of a third symbol for the third aircraft, wherein the third size is inversely proportional to the distance from the third aircraft to the second line segment; and
   displaying the second and third symbols.

2. The method of claim 1 wherein the processing steps each comprise processing speed and heading and the determining steps are also based on the speed and heading of the second and third aircraft, respectively.

3. The method of claim 1 wherein the processing steps each comprise processing the lateral distance between the second aircraft and the current line segment, and the between the third aircraft and the planned line segment, and the determining steps are also based on the lateral distance of the second and third aircraft, respectively.

4. The method of claim 1 wherein the processing steps each comprise processing the rate of closure of the second aircraft and the third aircraft with the current and planned line segments, respectively.

5. The method of claim 1 wherein the displaying the second and third symbols comprises displaying the second and third symbols in one of a plurality of colors.

6. A system for displaying aircraft symbology for a base aircraft and a plurality of obstacle aircraft, comprising:
   a processor configured for determining a flight plan including a current line segment and a planned line segment;
   said processor configured for processing an altitude for each of the plurality of obstacle aircraft and determining a size for the display of each of the plurality of obstacle aircraft based on the difference in altitude from the closest of the current line segment and the planned line segment; and
   a display configured for displaying a symbol for each of the plurality of obstacle aircraft in accordance with the determined size, and a predetermined symbol for the first aircraft.

7. The system of claim 6 wherein the display comprises a color display for displaying the plurality of obstacle aircraft in one of a plurality of colors based on the determined altitude.

* * * * *